No. 766,852. PATENTED AUG. 9, 1904.
G. W. THOMAS.
HOOF TRIMMER.
APPLICATION FILED DEC. 8, 1903.
NO MODEL.

Witnesses
E. F. Stewart
C. K. Woodward

George W. Thomas,
Inventor
by C. A. Snow & Co.
Attorneys

No. 766,852.	Patented August 9, 1904.

UNITED STATES PATENT OFFICE.

GEORGE WASHINGTON THOMAS, OF YOSEMITE, KENTUCKY.

HOOF-TRIMMER.

SPECIFICATION forming part of Letters Patent No. 766,852, dated August 9, 1904.

Application filed December 8, 1903. Serial No. 184,331. (No model.)

*To all whom it may concern:*

Be it known that I, GEORGE WASHINGTON THOMAS, a citizen of the United States, residing at Yosemite, in the county of Casey and State of Kentucky, have invented a new and useful Hoof-Trimmer, of which the following is a specification.

This invention relates to implements employed by horseshoers for trimming the hoofs preparatory to the attachment of the shoes, and has for its object to produce a device of this character simple in construction, easily applied and operated, and whereby the trimming of the hoofs may be expeditiously and uniformly accomplished; and the invention consists in certain novel features of construction, as hereinafter shown and described, and specified in the claims.

Figure 1:
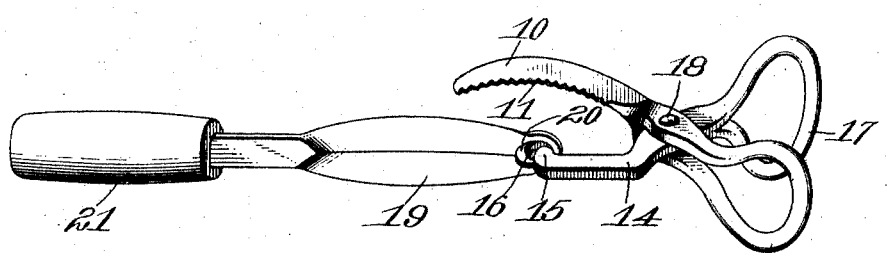
Figure 3:
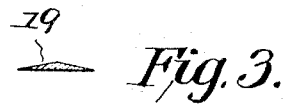
Figure 2:
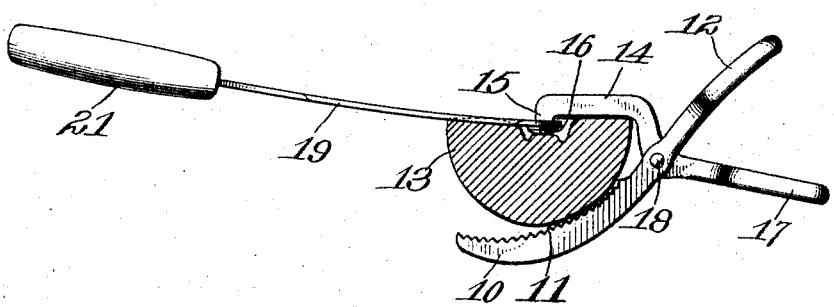

In the drawings illustrative of the invention, in which corresponding parts are denoted by like designating characters, Figure 1 is a perspective view of the improved implement. Fig. 2 is a side elevation of the implement applied. Fig. 3 is a transverse section, enlarged, of the trimming-blade.

The improved implement comprises an outer jaw member having a curved or convex portion 10, with serrations 11 in the inner or concaved face and with the other end extended into a handle 12, the serrated surface for bearing against the outer surface of the hoof, (indicated at 13,) and an inner jaw member 14, having at one end a lateral extension 15, terminating in an enlargement 16 to form a pad for bearing against the under surface of the hoof, and with the other end extended into a handle 17.

The two jaw members are pivotally united, as at 18, and when thus constructed and united it will be obvious that an implement is produced which may be firmly clamped to the hoof by compressing the handles 12 17, the concaved serrated portion 10 11 bearing upon the outer or upper side of the hoof and the extension 15, with its "pad" portion 16, bearng upon the under side of the hoof forward of the frog and forming a means for supporting the paring-knife, (represented at 19.)

The paring-knife is formed with an elongated aperture 20 in one end and with a handle 21 at the other end, the aperture being adapted to detachably engage the extension 15 between the enlargement 16 and the shank of the jaw 14, so that the knife is free to swing around the portion 15 as a center and be held from displacement by the enlargement 16, as will be obvious.

The knife member is formed with two cutting edges, and the blade-body is curved outward near the apertured end, as shown in Fig. 2, so that it will cut the "cushion" of the hoof to a slightly-greater greater depth than at the outer edge or "horny" portion to cause the shoe to rest more firmly upon this hard horny portion. This is an important feature of the invention and adds materially to the value and effectiveness of the implement.

In using the implement the jaw members are first clamped to the hoof from one side and the paring-knife operated upon the opposite side and the jaw members then reversed and the knife operated upon the side of the hoof from which the clamp has been removed. Thus the whole under surface of the hoof can be quickly and uniformly "pared" preparatory to the attachment of the shoe.

The implements will preferably be of steel and will be of various sizes to suit different sizes of hoofs and will be found very convenient and useful for the purposes described.

The surface of the knife 19 next the hoof is flat, as shown in Fig. 3, so that it cuts uniformly and reduces the labor required to operate it.

Having thus described the invention, what I claim is—

1. In a hoof-trimmer, an outer jaw member for bearing against the outer surface of the hoof, an inner jaw member pivoted to said outer jaw member and having its inner end turned laterally for bearing against the under side of the hoof, and a paring-knife pivoted to said lateral portion between the hoof and the shank of the inner jaw member, substantially as described.

2. In a hoof-trimmer, an outer jaw member for bearing against the outer surface of the hoof, an inner jaw member pivoted to said outer jaw member and having its inner end turned laterally and enlarged into a pad for bearing upon the under surface of the hoof, and a paring-knife having an elongated aperture for detachable engagement with said lateral portion of said inner jaw member between the shank of the jaw and said pad enlargement, substantially as described.

3. In a hoof-trimmer, an outer jaw having a concaved serrated inner surface for bearing against the outer face of the hoof, an inner jaw pivoted to said outer jaw and terminating in a lateral extension for bearing against the inner surface of the hoof, and a paring-knife movably connected to said extension between the hoof and the shank of the inner jaw, substantially as described.

4. In a hoof-trimmer, an outer jaw member for bearing against the outer surface of the hoof, an inner jaw member pivoted to said outer jaw member and having its inner end turned laterally for bearing against the under side of the hoof, and a paring-knife pivoted to said lateral portion between the hoof and the shank of the inner jaw member with the body of the blade curving outwardly away from the hoof, substantially as described.

5. In a hoof-trimmer, an outer jaw having at one end a concaved serrated surface for bearing against the outer side of the hoof, and with the other end extended into a handle, an inner jaw intermediately pivoted to said outer jaw and having at one end a lateral extension for bearing against the under side of the hoof and with the other end extended into a handle, and a paring-knife movably connected to said lateral extension between the hoof and the shank of the inner jaw, substantially as described.

In testimony that I claim the foregoing as my own I have hereto affixed my signature in the presence of two witnesses.

GEORGE WASHINGTON THOMAS.

Witnesses:
J. L. TAYLOR,
D. BASTIN.